(12) United States Patent
Wang et al.

(10) Patent No.: US 9,834,242 B2
(45) Date of Patent: Dec. 5, 2017

(54) SMART DOLLY

(71) Applicants: Guangwei Wang, Fijian (CN); Zhoumin Ni, New York, NY (US)

(72) Inventors: Guangwei Wang, Fijian (CN); Zhoumin Ni, New York, NY (US)

( * ) Notice: Subject to any disclaimer, the term of this patent is extended or adjusted under 35 U.S.C. 154(b) by 0 days.

(21) Appl. No.: 15/292,376

(22) Filed: Oct. 13, 2016

(65) Prior Publication Data

US 2017/0106891 A1    Apr. 20, 2017

(30) Foreign Application Priority Data

Oct. 14, 2015    (CN) .................... 2015 2 0790818 U

(51) Int. Cl.
| | |
|---|---|
| *B62B 5/00* | (2006.01) |
| *B62B 5/04* | (2006.01) |
| *B62B 5/06* | (2006.01) |
| *B60L 11/18* | (2006.01) |
| *B62B 3/00* | (2006.01) |

(52) U.S. Cl.
CPC ........ *B62B 5/0069* (2013.01); *B60L 11/1818* (2013.01); *B62B 3/001* (2013.01); *B62B 5/0036* (2013.01); *B62B 5/0053* (2013.01); *B62B 5/0066* (2013.01); *B62B 5/04* (2013.01); *B62B 5/06* (2013.01); *B60L 2240/421* (2013.01); *B60L 2250/16* (2013.01); *B60Y 2200/91* (2013.01); *B60Y 2306/05* (2013.01); *B60Y 2400/112* (2013.01); *B60Y 2400/92* (2013.01); *B62B 2301/04* (2013.01)

(58) Field of Classification Search
None
See application file for complete search history.

(56) References Cited

U.S. PATENT DOCUMENTS

| | | | | |
|---|---|---|---|---|
| 3,312,300 | A * | 4/1967 | Jones ........................ | B60P 3/00 180/19.2 |
| 4,570,731 | A * | 2/1986 | Oaks .................... | B60L 11/1805 180/19.3 |
| 4,867,439 | A * | 9/1989 | Salyer ................ | A63B 21/0618 482/118 |
| 5,142,910 | A * | 9/1992 | Litchman ............... | A61B 5/224 73/379.03 |

(Continued)

*Primary Examiner* — John Walters
*Assistant Examiner* — Hilary L Johns
(74) *Attorney, Agent, or Firm* — Weitzman Law Offices, LLC

(57) ABSTRACT

A smart dolly includes a running mechanism and a body, the running mechanism comprises an equipment box and a rear axle housing, the equipment box is disposed on the rear axle housing, a battery, electric motor and control computer are provided in the equipment box, the battery and the electric motor are both electrically connected to the control computer, the equipment box has a charging plug thereon, the charging plug is electrically connected to the battery, the rear axle housing is provided with a differential clutch and an axle therein, the differential clutch and the axle form a transmission, the differential clutch is driven by the electric motor, the electric motor is provided with an electromagnetic braking device and a heat dissipation fan, and the external ends of the axle are connected to wheels; the body comprises an upper, middle and lower support rods.

5 Claims, 5 Drawing Sheets

(56) References Cited

U.S. PATENT DOCUMENTS

| | | | | |
|---|---|---|---|---|
| 5,735,361 | A * | 4/1998 | Forrest | A63C 11/10 180/180 |
| 5,810,697 | A * | 9/1998 | Joiner | A63B 21/06 280/47.371 |
| 6,062,328 | A * | 5/2000 | Campbell | B62B 5/0026 180/216 |
| 6,086,517 | A * | 7/2000 | Schapmire | A63B 21/015 482/68 |
| 6,435,407 | B1 * | 8/2002 | Fiordelisi | A47F 9/045 235/383 |
| 8,469,861 | B1 * | 6/2013 | McFee | A63B 69/0028 482/4 |
| 2002/0086780 | A1 * | 7/2002 | Morris | A63B 69/345 482/136 |
| 2007/0131461 | A1 * | 6/2007 | Treadwell | B62B 5/005 180/19.1 |
| 2009/0127807 | A1 * | 5/2009 | Cornwell | B62B 3/006 280/28.5 |
| 2012/0012409 | A1 * | 1/2012 | Turner | B60L 3/0061 180/65.31 |
| 2012/0090904 | A1 * | 4/2012 | Bezile | A61G 5/047 180/11 |
| 2013/0274973 | A1 * | 10/2013 | Kamara | B62B 5/026 701/22 |
| 2014/0231164 | A1 * | 8/2014 | Michel, Jr. | B62B 1/18 180/218 |
| 2016/0039445 | A1 * | 2/2016 | Sommers | B62B 1/10 180/19.1 |
| 2016/0101803 | A1 * | 4/2016 | Ahlemeier | B62B 9/08 180/167 |
| 2016/0221594 | A1 * | 8/2016 | Kubo | B62B 5/068 |
| 2016/0264166 | A1 * | 9/2016 | Miller | B62B 1/125 |

* cited by examiner

SMART DOLLY

FIELD OF THE INVENTION

The present application relates to transportation carts and, more particularly, to a dolly-type transportation cart.

BACKGROUND

A dolly, also commonly known as a "tiger cart", is a hand truck used for transporting goods in a warehouse. A dolly typically comprises a frame, the frame bottom is connected with a nose and a frame support, an axle is mounted on the frame support, and two ends of the axle are connected with wheels. In use, the nose is inserted underneath the stacked goods, then the top end of the frame is tilted downward, such that the nose moves upward and leaves the ground, and at this point, the goods are supported by the frame. When the frame is tilted by a certain angle, the dolly can be moved to a designated location. Subsequently, the top end of the frame is pushed upward, such that the nose moves downward to touch the ground, and then the goods can be unloaded. However, such an existing dolly has many deficiencies, for example, the entire process is manual, so when the transported goods are heavy, the work intensity is high. Manual pulling is slow and inefficient, which tends to delay normal operation of a production line, and the labor cost is high as well.

SUMMARY

The present disclosure provides a smart dolly, which addresses the defects of labor intensity and inefficiency present in dollies according to the prior art.

One aspect involves a smart dolly having a running mechanism and a body. The running mechanism comprises an equipment box and a rear axle housing, the equipment box is disposed on the rear axle housing. A battery, an electric motor and a control computer are provided in the equipment box. The battery and the electric motor are both electrically connected to the control computer. The equipment box is further provided with a charging plug thereon the charging plug is electrically connected to the battery. The rear axle housing is provided with a differential clutch and an axle therein, the differential clutch and the axle form a transmission. The differential clutch is driven by the electric motor. The electric motor is provided with an electromagnetic braking device and a heat dissipation fan. The external ends of the axle are connected to wheels. The body comprises an upper support rod, a middle support rod, and a lower support rod and the tail end of the upper support rod is fixedly connected to the equipment box. A tray is fixed above the equipment box. The head end of the upper support rod is provided with a handle, a battery switch, a driving and reversing speed regulation device, a brake switch, and a power display. The battery switch, the driving and reversing speed regulation device, the brake switch, and the power display are all electrically connected to the control computer. The upper support rod is further provided with a frame hook and a latch bar. The tail end of the lower support rod is in rotatable connection with the rear axle housing. The lower support rod is provided with a slide-able sleeve thereon. The bottom of the sleeve is connected to an omni-directional caster and the side of the sleeve is provided with a latch pin for engagement by the latch bar. Two ends of the middle support rod are pivotably connected to the upper support rod and the sleeve, respectively.

Furthermore, with another aspect, the head end of the upper support rod is provided with a limit switch, electrically connected to the control computer. When the limit switch hits a person, the control computer controls the smart dolly to run in a reversed direction for 100 mm and then stop.

With an additional aspect, the upper support rod is further provided with a loudspeaker and a loudspeaker switch. The loudspeaker is electrically connected to the loudspeaker switch, and the loudspeaker switch is electrically connected to the control computer.

With a further aspect, the handle is a bull's horn-shaped handle.

With yet another aspect, the tail end of the lower support rod is rotatably connected to the rear axle housing by means of a bearing.

The disclosed embodiments can have the following advantages.

Embodiments of the smart dolly use the control computer to control the forward and backward movements, as well as the speed of the forward and backward movement of the smart dolly through a driving and reversing speed regulation device, and can control stopping of the smart dolly using the brake switch, which can save labor and reduce work intensity.

The remaining power of the battery can be seen in real time through the power display, and when the remaining power is insufficient, the battery can be recharged through the charging plug, leading to convenient and simple use.

Since the sleeve may slide along the lower support rod, and two ends of the middle support rod are pivotably connected to the upper support rod and the sleeve, respectively, the upper support rod and the lower support rod may be collapsed when the sleeve slides to the tail end of the lower support rod, to take up less space.

When the limit switch is provided at the head end of the upper support rod, the control computer controls the smart dolly to run in a reversed direction for 100 mm and then stop if the limit switch hits a person, which can ensure the safety of an operator.

The upper support rod is further provided with a loudspeaker and a loudspeaker switch, which can alert a person in the front through the loudspeaker and ensure the safety of the person in the front.

The foregoing and following outlines rather generally the features and technical advantages of one or more embodiments of this disclosure in order that the following detailed description may be better understood. Additional features and advantages of this disclosure will be described hereafter, which may form the subject of the claims of this application.

DETAILED DESCRIPTION

Figure 1:
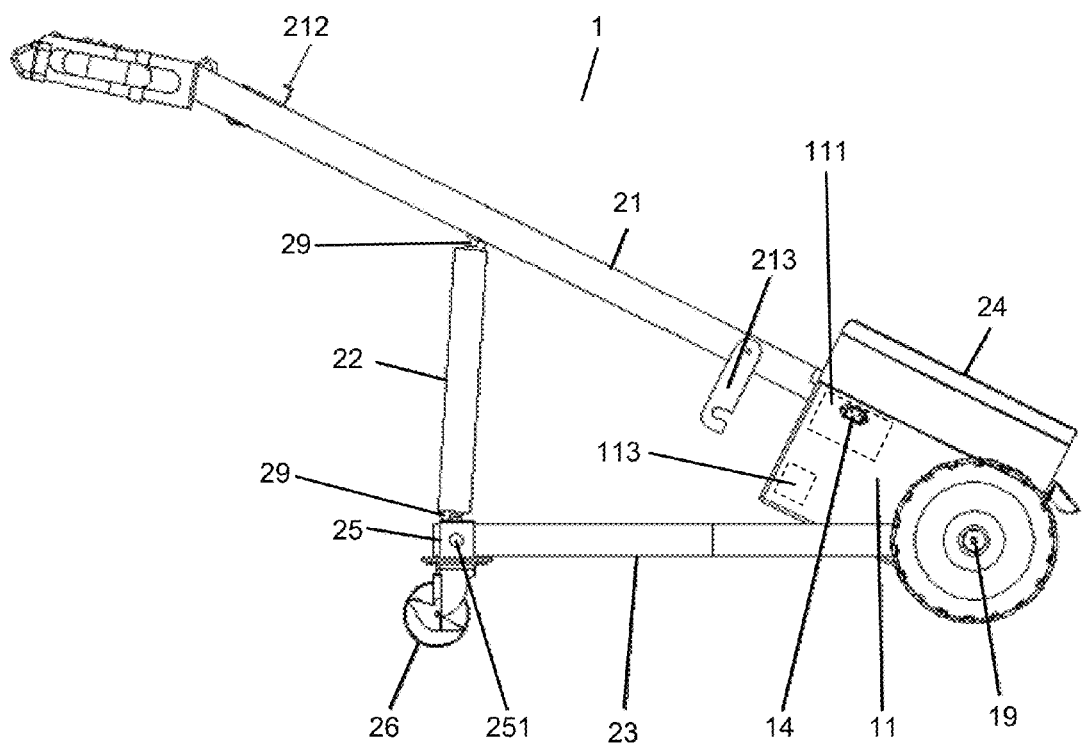
FIG. 1 is a front view of one example smart dolly.

With reference to FIGS. 1 through 5, the smart dolly 1 comprises a running mechanism and a body. The running mechanism comprises an equipment box 11 and a rear axle housing 12. The equipment box 11 is disposed on the rear axle housing 12; a battery 111, an electric motor 13 and a control computer 113 are provided in the equipment box 11. The battery and the electric motor 13 are both electrically connected to the control computer. The equipment box 11 is further provided with a charging plug 14 thereon, the charging plug 14 is electrically connected to the battery. The rear axle housing 12 includes a differential clutch 15 and an axle 16 therein, such that the differential clutch 15 and the axle 16 form a transmission. The differential clutch 15 is driven by the electric motor 13. The electric motor 13 includes an electromagnetic braking device 17 and a heat dissipation fan 18. The external ends of the axle 16 are connected to wheels 19. The body comprises an upper support rod 21, a middle support rod 22, and a lower support rod 23; the tail end of the upper support rod 21 is fixedly connected to the equipment box 11. A tray 24 is fixed above the equipment box 11. The head end of the upper support rod 21 is provided with: a handle 211, a battery switch 214, a driving and reversing speed regulation device 216, a brake switch 218, and a power display 220. The battery switch 214, driving and reversing speed regulation device 216, brake switch 218, and the power display 22 are all electrically connected to the control computer.

The upper support rod 21 is further provided with a frame hook 212 and a latch bar 213.

The tail end of the lower support rod 23 is in rotatable connection with the rear axle housing 12 and the lower support rod 23 is also provided with a slide-able sleeve 25 thereon. The bottom of the sleeve 25 is connected to an omni-directional caster 26. The side of the sleeve 25 is provided with a latch pin 251 for engagement by the latch bar 213. The two ends of the middle support rod 22 are pivotably connected 29 to the upper support rod 21 and the sleeve 25, respectively.

The smart dolly is driven by the electric motor 13, intelligently controlled by the control computer, to control the forward and backward movements, as well as the speed of forward and backward movements of the smart dolly through a driving and reversing speed regulation device, and can control stopping of the smart dolly using the brake switch, which can save labor and reduce work intensity.

The remaining power of the battery can be seen in real-time through the power display 220, and when the remaining power is insufficient, the battery can be recharged through the charging plug, leading to convenient and simple use.

Since the sleeve 25 may slide along the lower support rod 23, and two ends of the middle support rod 22 are, respectively, pivotably connected 29 to the upper support rod 21 and the sleeve 25, the upper support rod 21 and the lower support rod 23 may be collapsed when the sleeve 25 slides to the tail end of the lower support rod 23, to take up a smaller space.

Figure 2:
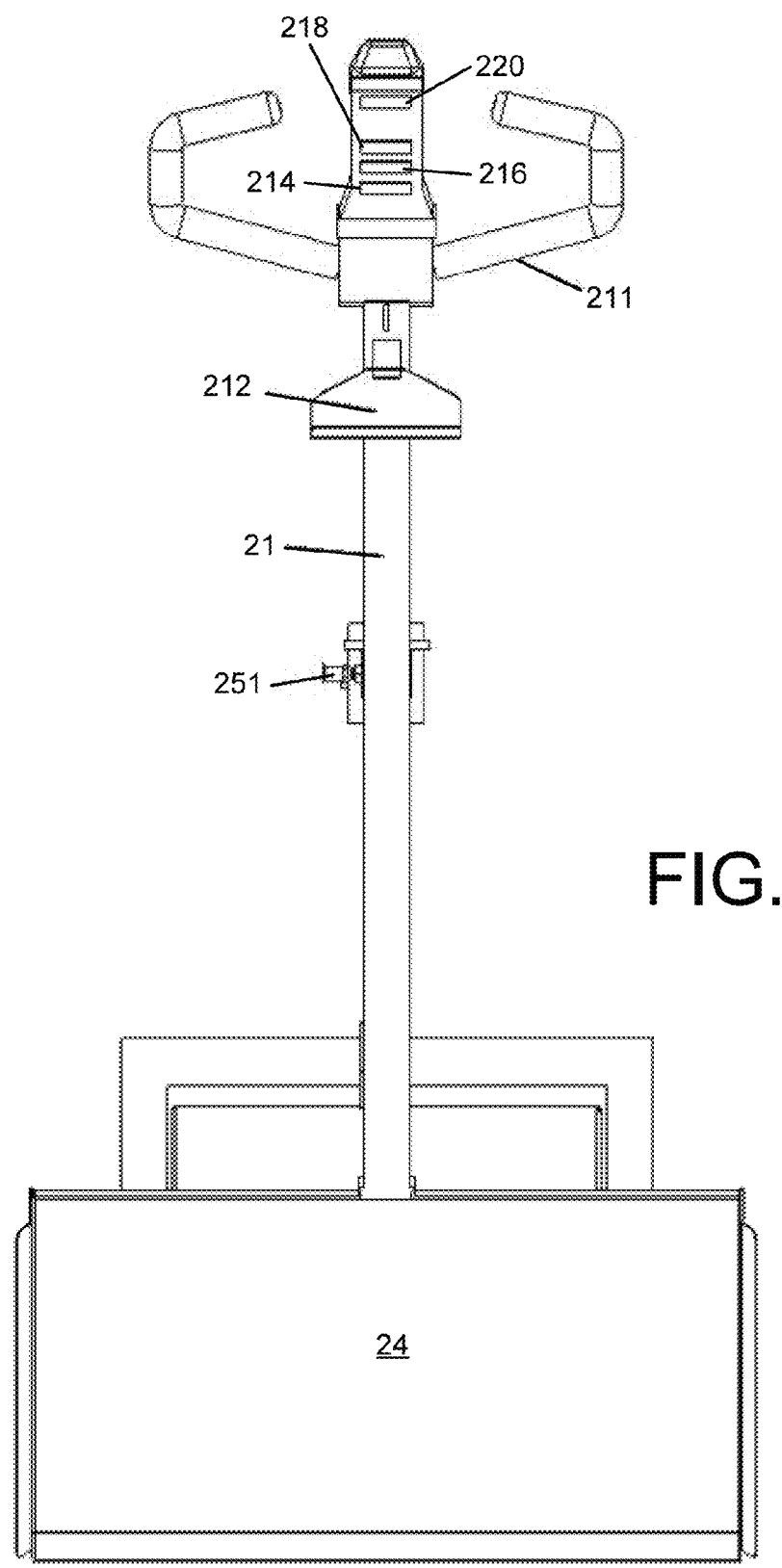
FIG. 2 is a top view of the smart dolly of FIG. 1.

In the embodiment of FIGS. 1 and 2, the head end 30 of the upper support rod 21 is further provided with a limit switch (not shown). The limit switch is electrically connected to the control computer, and when the limit switch hits a person, the control computer controls the smart dolly to run in a reversed direction for 100 mm and then stop, which can ensure the safety of a user.

In the present embodiment, the upper support rod 21 is further provided with a loudspeaker (not shown) and a loudspeaker switch (not shown), the loudspeaker is electrically connected to the loudspeaker switch, and the loudspeaker switch is electrically connected to the control computer. The loudspeaker can be used to alert a person in front of the smart dolly and ensure the safety of the person in the front.

Figure 3:
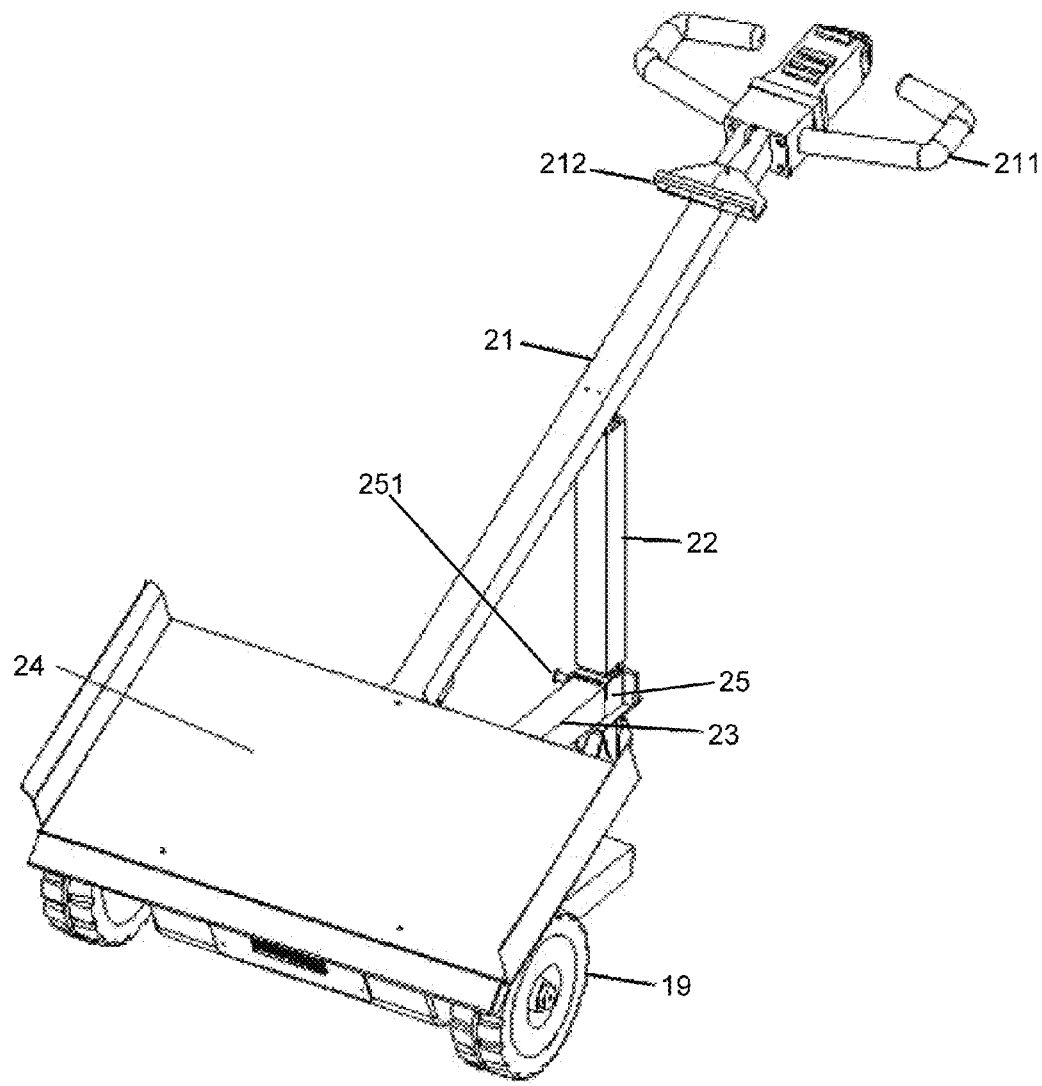
FIG. 3 is a 3-D view of the smart dolly of FIG. 1.
Figure 4:
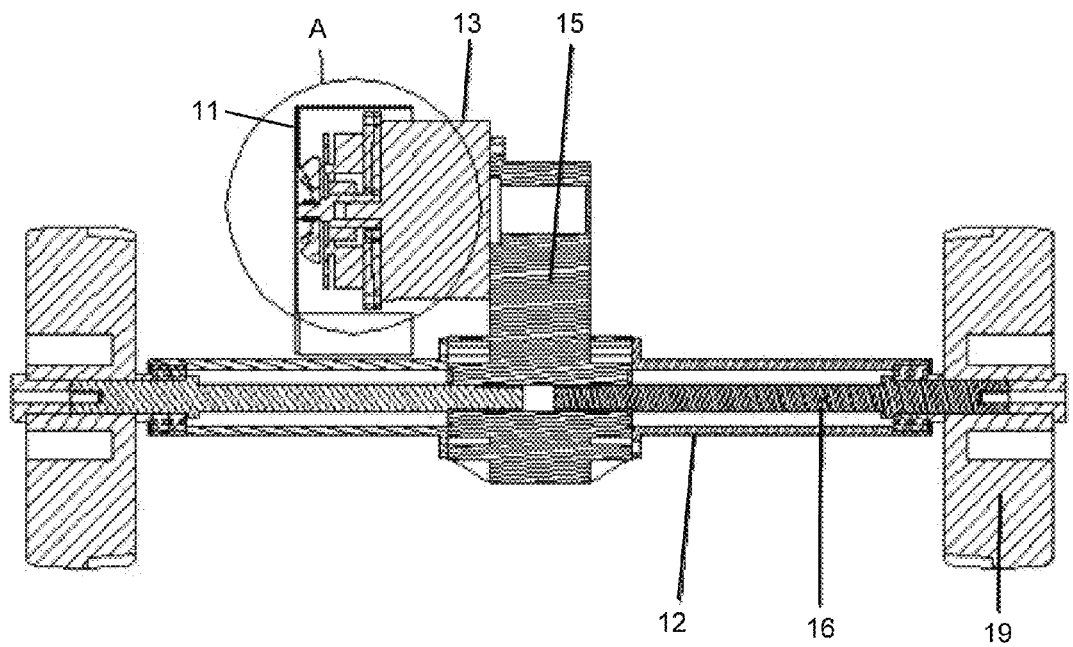
FIG. 4 is a schematic view of a partial structure of the running mechanism of the smart dolly of FIGS. 1-3.
Figure 5:
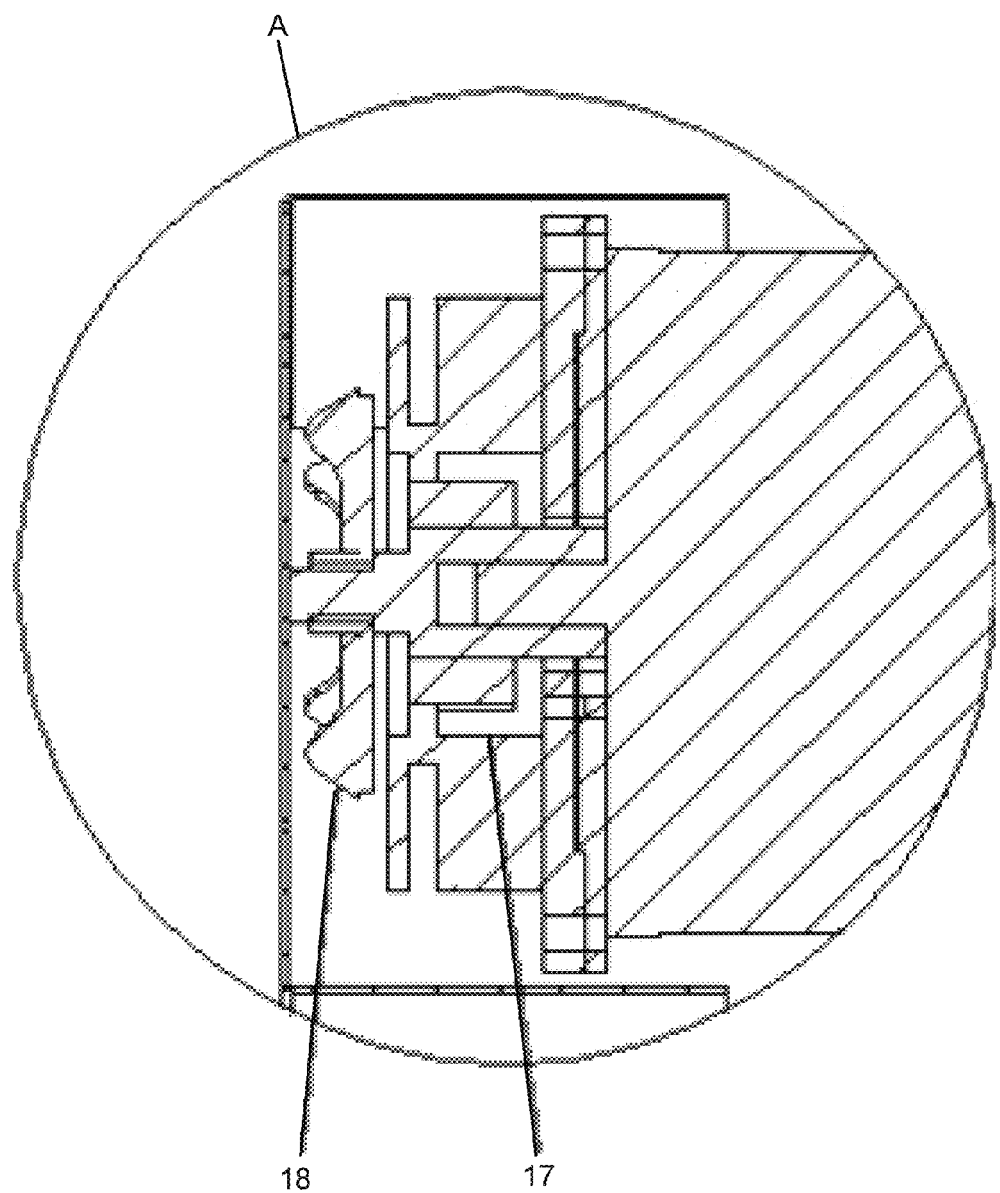
FIG. 5 is a partially enlarged view of portion "A" from FIG. 4.

As shown in FIGS. 2 and 3, the handle 211 is a bull's horn-shaped handle. The selection of a bull's horn-shaped handle enables an operator to have a better grip and to use less effort in pushing and pulling, and moreover, non-slip treads or sponge cushioning grips may be provided on the surface of the bull's horn-shaped handle 211, which can prevent slipping or protect the user's hands.

Finally, the tail end of the lower support rod 23 is rotatably connected to the rear axle housing 12 by means of a bearing (not shown).

What is claimed is:
1. A smart dolly, comprising:
 (a) a running mechanism comprising
  (i) a battery,
  (ii) a rear axle housing having a differential clutch and an axle therein, wherein the differential clutch and the axle form a transmission, and
  (iii) an equipment box disposed on the rear axle housing, the equipment box having
   (A) a charging plug thereon and
   (B) an electric motor and a control computer therein,
  (iv) wherein the battery and the electric motor are both electrically connected to the control computer, and the charging plug is electrically connected to the battery,
  (v) wherein the differential clutch is driven by the electric motor,
  (vi) wherein the electric motor includes an electromagnetic braking device and a heat dissipation fan, and
  (vii) wherein external ends of the rear axle are connected to wheels; and
 (b) a body comprising
  (i) a tray, fixed above the equipment box;
  (ii) an upper support rod, a middle support rod, and a lower support rod,
   (A) wherein the tail end of the upper support rod is fixedly connected to the equipment box;
   (B) wherein a head end of the upper support rod is provided with a handle, a battery switch, a driving and reversing speed regulation device, a brake switch, and a power display,
   (C) wherein the battery switch, the driving and reversing speed regulation device, the brake switch, and the power display are all electrically connected to the control computer;
   (D) wherein the upper support rod is further provided with a frame hook and a latch bar;
   (E) wherein a tail end of the lower support rod is in rotatable connection with the rear axle housing;
   (F) wherein the lower support rod is provided with a sleeve thereon, a bottom of the sleeve is connected to an omni-directional caster, and a side of the sleeve is provided with a latch pin; and
   (G) wherein, two ends of the middle support rod are in pivot connection with the upper support rod and the sleeve, respectively.
2. The smart dolly of claim 1, wherein the handle is a bull's horn-shaped handle.
3. The smart dolly of claim 2, wherein the bull's horn-shaped handle further includes at least one of non-slip treads or sponge cushioning grips.
4. The smart dolly of claim 1, wherein the sleeve is slideable along the lower support rod.

5. The smart dolly of claim 4, wherein the pivot connection between the middle support rod and both the upper support rod and sleeve allows the smart dolly to collapse and be maintained in the collapsed position by engaging the latch pin with the latch bar.

\* \* \* \* \*